United States Patent [19]
Hibler

[11] Patent Number: 6,001,200
[45] Date of Patent: *Dec. 14, 1999

[54] EDGE PROTECTOR

[76] Inventor: Stanley A. Hibler, 3286 Stadler Dr., Pickerington, Ohio 43137

[*] Notice: This patent is subject to a terminal disclaimer.

[21] Appl. No.: 09/021,777

[22] Filed: Feb. 11, 1998

Related U.S. Application Data

[63] Continuation-in-part of application No. 08/709,185, Sep. 6, 1996, Pat. No. 5,839,250.

[51] Int. Cl.⁶ .............................. B32B 31/04; E04G 21/00
[52] U.S. Cl. ............................. 156/71; 156/212; 156/249; 52/746.1; 428/41.8; 428/343
[58] Field of Search .............................. 156/71, 212, 216, 156/249; 52/254, 255, 746.1; 428/40.1, 41.8, 43, 343

[56] References Cited

U.S. PATENT DOCUMENTS

| | | |
|---|---|---|
| 3,350,825 | 11/1967 | Rillo . |
| 4,863,774 | 9/1989 | Tucker . |
| 5,037,686 | 8/1991 | Conboy . |
| 5,045,374 | 9/1991 | Tucker . |
| 5,138,810 | 8/1992 | Kartler . |
| 5,246,775 | 9/1993 | Loscuito . |
| 5,418,027 | 5/1995 | Conboy . |
| 5,428,929 | 7/1995 | Reese . |
| 5,459,969 | 10/1995 | Stibolt et al. .............................. 52/254 |
| 5,604,001 | 2/1997 | Schold . |
| 5,657,955 | 8/1997 | Adams . |
| 5,839,250 | 11/1998 | Hibler .............................. 52/746.1 |

FOREIGN PATENT DOCUMENTS 2 224 049   4/1990   United Kingdom .

*Primary Examiner*—Curtis Mayes
*Attorney, Agent, or Firm*—Mueller and Smith, LPA

[57] ABSTRACT

Broadly, the present invention is directed to an edge protector method and system for protecting an outside corner, e.g., of a room, which corner is formed by two walls or faces. The novel tape for protecting such outside corner is formed from polymeric material desirably having a thickness of from about 5 to 20 mils and which is formed from a pair of sides with an interconnecting hinge, said sides formed from a relatively stiff polymeric material compared to said hinge which is formed from a relatively flexible and elastic polymeric material compared to said sides, said hinge preferably being arcuate in shape, said tape having a front surface and a rear surface which is coated with a pressure sensitive adhesive. The novel tape is applied to the corner by its unrolling from the roll with the hinge in axial alignment with the outside corner followed by pressing of the coated rear surface sides on each face extending from the corner to form a corner edge protector for the corner.

10 Claims, 1 Drawing Sheet

U.S. Patent     Dec. 14, 1999     6,001,200
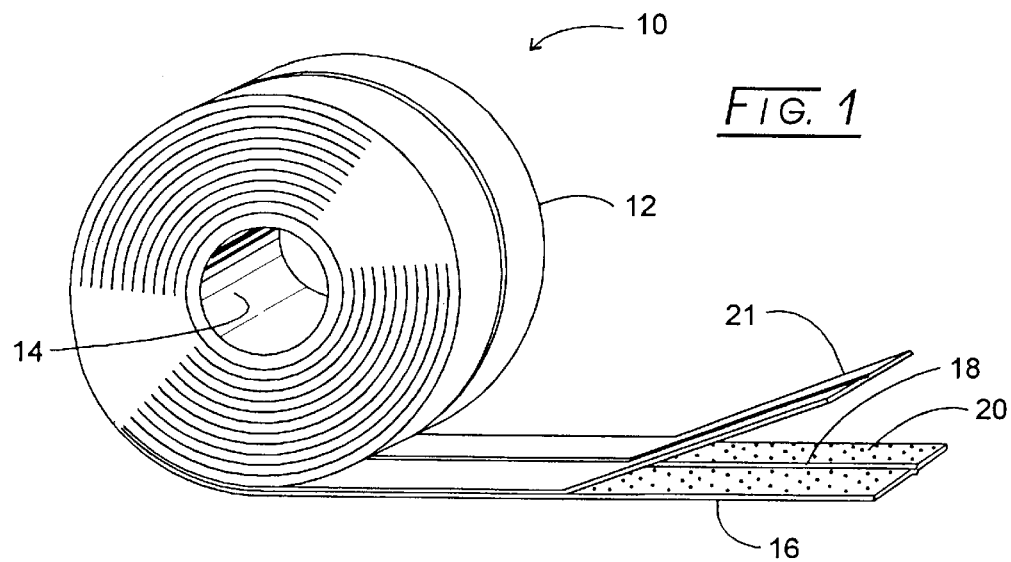
FIG. 1
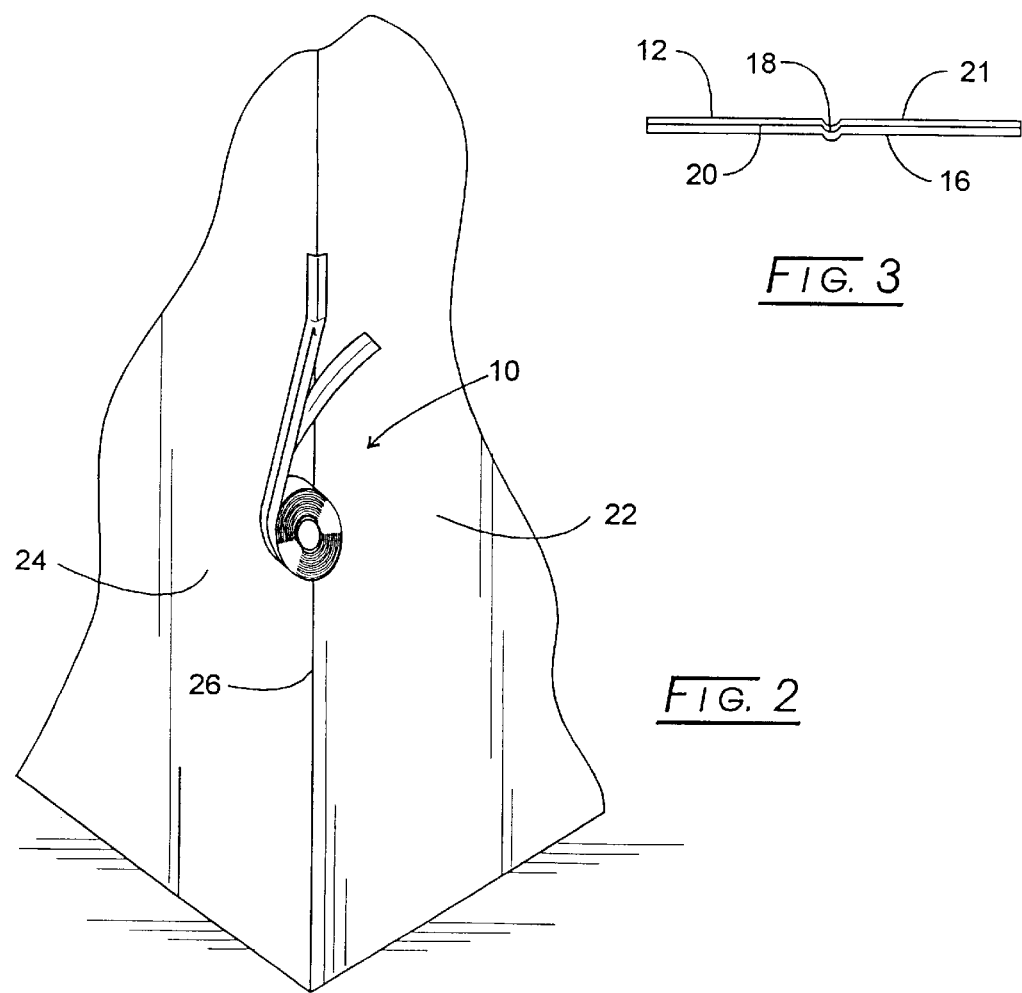
FIG. 3
FIG. 2

EDGE PROTECTOR

CROSS-REFERENCE TO RELATED APPLICATIONS

This application is a continuation-in-part application of Ser. No. 08/709,185 filed Sep. 6, 1996, now U.S. Pat. No. 5,839,250, the disclosure of which is expressly incorporated herein by reference.

BACKGROUND OF THE INVENTION

The present invention relates to providing protection for corners in rooms and more particularly to a tape protector therefor provided in roll or tape form.

Outside corners between rooms and halls often become nicked due to being bumped and scraped by objects passing by and by being bumped by people passing by. Often these objects are being carried, pushed, or pulled by people as they traverse between rooms. Paint and wallpaper at these outside corners become chipped and torn as a result of being bumped and scraped. This is true whether the outside corners are located in a residence or a commercial establishment.

As a result, resort is made to the use of "corner guards" which are rigid, V-shaped transparent plastic protectors that often come in 4 or 8 foot lengths and can be cut to shorter lengths, for example, with a saw. These rigid corner guards often are attached by nails which can be driven through the rigid plastic into the one or both of the wall sections that form the outside corner for which protection is desired. Alternatively, some rigid corner guards can be secured by a pressure sensitive adhesive applied to the back of such rigid corner guards.

Unfortunately, such rigid corner guards often are regarded as unsightly and can be objectionable in a finely-appointed residence. Moreover, nail holes remain in the walls when the corner guards are removed. In fact, removal of such rigid corner guards often results in their being cracked or broken, so that they cannot be reused. Often, these rigid corner guards can become loosened when an object carried past them catches on an edge of the corner guard. More recently, a thin strip of adhesive has been applied to the backs of the rigid corner guards to secure them to the wall corners.

In other contexts, corners of kitchen countertops, for example, need protection from pots and pans being banged thereinto and small children, for example, need protection from bumping their heads into the sharp corners of such countertops.

Consequently, there appears to be a need for an outside corner edge protector that is easy to install, is relatively thin, and has applicability to use in other contexts, say, kitchen countertops and the like.

SUMMARY OF THE INVENTION

Broadly, the present invention is directed to an edge protector method and system for protecting an outside corner, e.g., of a room which corner is formed by two walls or faces. While ordinarily such corner is inside a structure, such as a house or apartment, the corner can be located outside as well. Such corners can be square, rounded, or of another configuration, and need not necessarily linear in their axial direction. Additional outside corners include, inter alia, countertop (kitchen) edges, table edges, shelves (e.g., kitchen cabinet shelves) and the like.

Broadly, the present invention is directed to an edge protector method and system for protecting an outside corner, e.g., of a room, which corner is formed by two walls or faces. The novel system employs a tape for protecting an outside corner which is formed by two surfaces and is formed from polymeric material in a thickness of about 5 to 20 mils and comprises a pair of sides with an interconnecting hinge, said sides formed from a relatively stiff polymeric material compared to said hinge which is formed from a relatively flexible and elastic polymeric material compared to said sides, said hinge being arcuate in shape, said tape having a front surface and a rear surface which is coated with a pressure sensitive adhesive.

The inventive method for protecting such corner employs a tape for protecting an outside corner which is formed by two walls and is formed from polymeric material formed into a pair of sides with an interconnecting hinge, said sides formed from a relatively stiff polymeric material compared to said hinge which is formed from a relatively flexible and elastic polymeric material compared to said sides, said hinge being arcuate in shape, said tape having a front surface and a rear surface which is coated with a pressure sensitive adhesive. The tape is unrolled from the roll with the hinge in axial (vertical) alignment with the room corner. Finally, the coated rear surface is pressed onto each face extending from the corner to form a corner edge protector for the corner. The coated rear surface may be pressed on each adjacent face simultaneously with the axial alignment of the hinge with the corner or subsequent thereto. The tape optionally may be cut to length or multiple pieces of tape may be placed in edge abutting relationship to extend a desired length along the corner. While the tape preferably is transparent, it also may be colored to match (or contrast) with the adjacent faces (walls) which may be painted, wall covered, or subject to other treatment.

Advantages of the present invention include a system for protecting outside corners which is easy to install. A further advantage is an edge protector system that does not damage the adjacent walls during its installation. These and other advantages will become readily apparent to those skilled in the art based on the instant disclosure.

BRIEF DESCRIPTION OF THE DRAWINGS

For a fuller understanding of the nature and objects of the present invention, reference should be had to the following detailed description taken in connection with the accompanying figures in which:

FIG. 1 is a perspective view of a roll of the pressure-sensitive adhesive coated, hinged edge protector tape wound convolutedly about a central core with an end portion of the tape being unwound;

FIG. 2 is a simplified perspective view of an outside corner formed by the meeting of two adjacent walls with a roll of the inventive PSA hinged tape being unwound to form an edge protector for the corner, and FIG. 3 is an end view of the hinged tape depicted in FIG. 1 with a release liner adhered to the adhesive side of the tape.

DETAILED DESCRIPTION OF THE INVENTION

As illustrated in FIG. 1, roll 10 is formed by winding tape 12 about core 14. Alternatively, tape 12 can be wound about a mandrel which can be removed so that no core is required. End 16, seen extending from roll 10, includes hinge 18 running axially along its length with an inner side of end 16 (and tape 12) being coated with PSA 20. While the outer surface of tape 12 can serve as the release liner for the PSA coated inner surface of tape 12 when forming roll 10, the construction of roll 10 depicted at FIG. 1 utilizes release liner 21 which is secured to PSA 20 and which is subsequently removed during installation of tape 12 to an outside corner. While much of the foregoing description refers to a room corner, it will be appreciated that other corners can equally receive installation of the novel tape system.

Tape 12 is formed from polymeric material which can be an acrylic or acrylate polymer, polyvinyl chloride, polycarbonate, polyethylene, polypropylene, EPDM (ethylene propylene diene monomer rubber), polysulfone, polyacrylonitrile, polystyrene, ABS (acrylonitrile butylene styrene polymers), and the like, and copolymers from monomers thereof. Desirably, the polymeric material used in forming tape 12 will be tough and resistant to tearing when bumped or scraped after its installation on an outside (room) corner. The tape additionally should provide a degree of protection to the underlying wall which also should not become cracked or deformed when the adjacent walls forming the corner are bumped. Thinness also is very desirable for tape 12 while providing the protection listed above. The polymeric material also should be able to form an elastic or flexible (so-called living) hinge, accept a PSA coating, and be inexpensive to manufacture and install. The polymeric material optionally can be fiber reinforced in conventional fashion for manufacturing an edge protector of superior strength. The polymeric material preferred considering these competing considerations is polyvinyl chloride (PVC) in a thickness of about 5 to 20 mils (0.125–0.5 mm), cost being an important factor in this selection. The tape has a preferred nominal width of about 1 inch, though this dimension can vary from about 0.5 inch upwards to 2 inches or more. A currently preferred edge protector has sides which are 15 mils thick and 0.4375 inches long, a hinge which is 5 mils thick and 0.125 (⅛) inches long, which makes the overall length of the protector 1 inch. Also, the preferred PVC material is printable should decorative edge protectors be desired. For that matter, the material can be pigmented for matching (or contrasting) with the walls (and corner) to which the protector is applied, or it can be translucent or transparent.

While the overall thickness of tape 12 can range from out 5 to 20 mils, it should be recognized that sides of tape 12 can be of thickness, say, ranging from about 9 to 20 mils with hinge 18 being thinner, say, ranging from about 5 to 10 mils. Alternatively, hinge 18 could be made of a more elastic and flexible polymer than the sides of tape 12. Regardless of the construction technique, the goal is to provide a flexible or living hinge 18 to tape 12 so that such living hinge can accommodate the stretching around the corner (e.g., corner 26 in FIG. 2) to which tape 12 is applied. By the same token, the sides of the tape that adhere to the corner's walls (e.g., walls 22 and 24 or FIG. 2) should be stiffer and more durable to resist abrasions. Hinge 18 should be arcuate in shape; although, the precise profile of hinge 18 is not critical.

A variety of commercial PSA's can be useful for present purposes. The PSA can be cast from organic solvent or from water and can be air cured or heat cured. Of importance is that the PSA provide good adherence of tape 12 to both painted walls as well as wallcovered walls. Presently, an acrylic adhesive which is applied by "transfer tape" techniques from a release liner is preferred. As stated above, a variety of commercial PSA adhesives meet these diverse criteria.

Hinge 18 can be made of more flexible or elastic material than the sides of tape 12 preferably by co-extruding PVC material with a differential thickness between hinge 18 and the sides of tape 12—hinge 18 being thinner and, thus, more flexible and elastic than the sides of tape 12. The surface of the tape 12 to be coated preferably faces the inside of hinge 18 to aid the installer in axially aligning the center (or other location) of tape 12 with the outside corner. Cosmetics, if not functionality, dictate that the edges or sides of tape 12 remain substantially parallel with the corner. Hinge 18 materially aids in accomplishing this purpose. In this regard, the instant edge protector system is ideally suited for the do-it-yourselfer or homeowner to install. Hinge 18 surely aids the amateur installer.

Further in this regard, reference is made to FIG. 2 which depicts walls or faces 22 and 24 which form outside corner 26 which most often will be inside a building (residence, apartment, commercial building, etc.). Installation of tape 12 from roll 10 involves aligning end 16 at the top or bottom of corner 26 followed by unrolling roll 10 while keeping hinge 18 in axial alignment with corner 26. Tape 12 can be pressed down to adhere to walls 22 and 24 simultaneously, or the installer can press one side on the tape to one of the walls, e.g., wall 22, and then go back and press tape 12 down onto the other wall, e.g., wall 24. Tape 12 can be cut readily with a scissors or knife. If the installer runs out of tape before covering all of corner 26, a new roll can be opened and its outer end abutted against tape 12 already installed to complete the installation procedure. Again, a facile edge protector system ideally suited for the homeowner has been revealed. Multiple layers of the novel edge protector also can be applied to corners for extra protection or to repair a protector which has been damaged.

Presently, it is preferred to provide the inventive tape with a scored release liner so that, during installation, one side of the liner can be peeled, the tape aligned with the corner, and then the second side of the liner peeled and pressed on. In this regard, it also is preferred to cut the tape to length before unpeeling any liner.

Besides protecting the substrate forming the corner (e.g., wall board) and any coating applied thereto (e.g., a latex, oil-based, or other paint), the novel edge protector keeps wallcovering edges from peeling or being accidentally pried loosed from the walls. In this regard, it should be understood that corner 26 need not be of an architectural structure, but can be a corner of a countertop, furniture (e.g., desk, table, crib, television set, etc.), or other object that requires protection to be provided for it for a person that might bump into it. For example, square-cornered countertops often are a danger to small children's heads. The inventive corner guard provides a cushion or padding to such sharp corner to protect from accidental injury to children and adults. The same inventive corner guard also protects the countertops (kitchen cabinet shelving, etc,) from damage caused by pots and pans banging against such corners. Thus, the uses for the inventive edge protector are only limited by the imagination of the user.

The foregoing description illustrates the present invention, but should not be construed as limiting it. All references cited herein are expressly incorporated herein by reference.

I claim:

1. A method for providing protection for an outside corner which is formed by two adjacent faces, which comprises:
   (a) supplying a tape formed from polymeric material which tape is wound in roll form and which tape is formed from a pair of sides with an interconnecting hinge formed from a flexible and elastic polymeric material, said tape having a front surface and a rear surface which is coated with a pressure sensitive adhesive;

(b) unrolling said tape from said roll with the hinge in axial alignment with the outside corner; and (c) pressing said coated rear surface sides on each face extending from the corner to form a corner edge protector for said corner.

2. The method of claim 1, wherein a release liner is affixed to the rear surface of said tape.

3. The method of claim 2, wherein said release liner is scored in axial alignment with the tape hinge.

4. The method of claim 3, wherein said hinge axially bisects said tape.

5. The method of claim 1, wherein said hinge axially bisects said tape.

6. The method of claim 1, wherein said pressure sensitive adhesive is a transfer tape acrylic adhesive.

7. The method of claim 1, wherein said tape is about 1 inch in width.

8. The method of claim 1, wherein said tape is formed from polyvinylchloride.

9. The method of claim 1, wherein said tape is one or more of translucent, pigmented, or transfer printed.

10. The method of claim 1, wherein said hinge is arcuate in shape.

* * * * *